F. McLOUGHLIN.
AUTOMATIC WATER-PIPE PRESSURE CUT-OFF.

No. 190,442. Patented May 8, 1877.

UNITED STATES PATENT OFFICE.

FRANCIS McLOUGHLIN, OF PEORIA, ILLINOIS, ASSIGNOR OF ONE-HALF HIS RIGHT TO PERRY FRAZER, OF SAME PLACE.

IMPROVEMENT IN AUTOMATIC WATER-PIPE PRESSURE CUT-OFFS.

Specification forming part of Letters Patent No. 190,442, dated May 8, 1877; application filed March 12, 1877.

*To all whom it may concern:*

Be it known that I, FRANCIS McLOUGHLIN, of the city of Peoria, in the county of Peoria, in the State of Illinois, have invented a Device for Regulating the Pressure of Water in Service-Pipes Automatically; and do hereby declare that the following is a full, clear, and exact description thereof, reference being had to the annexed drawings, making a part of this specification, in which like letters of reference refer to like parts, and in which—

Figure 1:
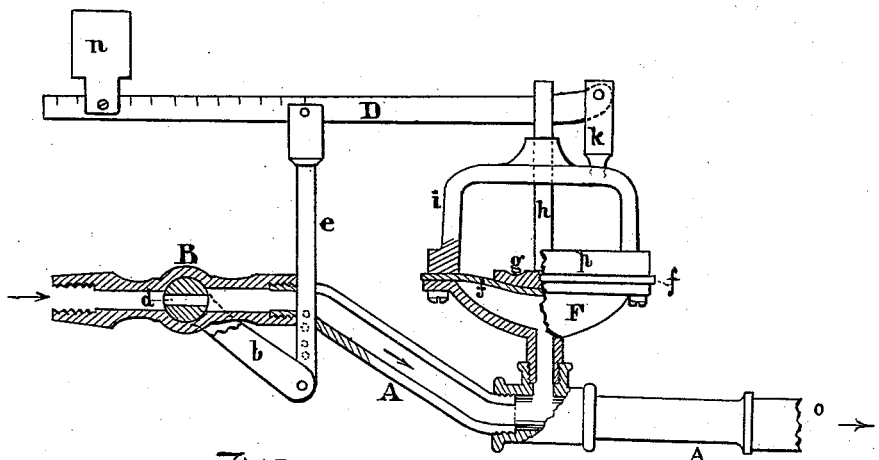
Figure 2:
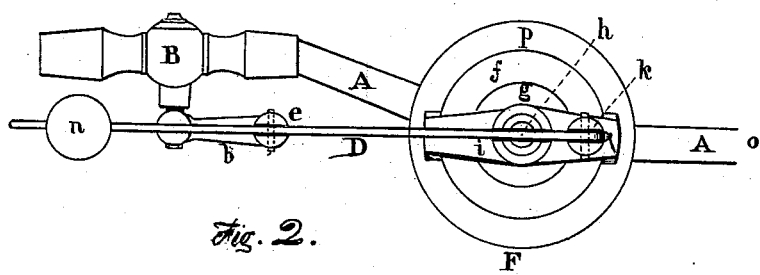

Figure 1 represents a section elevation; Fig. 2, a superficial view.

The object of this invention is to regulate the pressure of water in service-pipes, and particularly designed to take extraordinary pressure off that part of a water-supply pipe within houses, particularly when water is at high pressure during conflagrations. To illustrate: If the pressure in the main pipe be seventy-five pounds, the pressure between my regulating cut-off valve and the house-outlet can be regulated to five, ten, and fifteen pounds, &c., by the adjustment of a weight upon a lever which connects the cut-off valve with the diaphragm and chamber placed between the cut-off and the outlet of the supply or service pipe. On the latter pipe, at a point between the main pipe and the house, I place a cock or valve, which is provided with a connection with a lever, or with the stem of a disk, which rests upon a diaphragm, the latter stretched across and closing a chamber opening into said supply-pipe between said valve or cock and the pipe-outlet or faucet, or terminal cock, said diaphragm being weighted, or connected with an adjustable weight or similar equivalent, in such a manner that the water-pressure upon said diaphragm partially or wholly closes the cut-off valve first mentioned, according to the adjustment of the weight or detents automatically.

In the drawings, which represent one of the forms in which I construct my invention, A represents the supply-pipe; B, a cock or valve, having the usual passage $d$ and an outside lever, $b$, the latter being connected by a rod, $e$, with a lever, D, between the sliding weight $n$ and its fulcrum $k$ over the chamber F. This chamber opens out of the supply-pipe, between said valve B and the terminal outlet $o$ of said pipe, and is made of such a form as to receive and be completely closed by an elastic diaphragm, $f$, fixed thereto by a ring or flange, $p$, in the usual manner known to the art. From the flange rises a bridge, $i$, carrying the lever-pivot or post $k$, and a slot for the steadying of the stem of the disk $g$, which rests upon the diaphragm $f$, and whose said stem $h$ is attached to the lever D.

The operation of this invention is as follows: It is obvious that the pressure of water in the service-pipe A when the outlet $o$ is closed, *i. e.*, when water is not being drawn off for use, will force up the diaphragm $f$, and raise the lever D, which, by means of the rod $e$ raises the short lever $b$ of the cock or valve B, and closes, or partially closes, the latter, according to the adjustment of the weight $n$, which is set at any desired degree of pressure, so that the pipe A may be relieved during fire-pressure, and maintain a continuous low pressure upon that portion of said pipe between said cock and the outlet of said pipe, so preventing all that portion of the same within the house from bursting and flooding the latter. The rod $e$ may be made adjustable, to set the cut-off B at desired positions by having several pivot-holes at one end.

What I claim as my invention is—

1. The combination, with the cut-off cock or valve B, of the adjustable link $e$, or adjustable connection with the weighted and graded lever D, the link or stem $h$ of disk $g$, the disk $g$, the diaphragm $f$, and diaphragm chamber F, substantially as and for the purposes described.

2. The combination with the water-service pipe A, cock or valve B, arm or lever $b$, rod $e$, weighted lever D, disk $g$, diaphragm $f$, and chamber F, opening from said pipe, substantially as and for the purpose described.

In testimony that I claim the foregoing automatic water-pressure cut-off, I have hereunto set my hand this 7th day of March, A. D. 1877.

FRANCIS McLOUGHLIN.

Witnesses:
H. W. WELLS,
SIDNEY A. HERBERT.